United States Patent [19]

Lane et al.

[11] 4,244,187
[45] Jan. 13, 1981

[54] VEHICLE ENGINE WITH TURBINE BYPASS FOR EXHAUST TREATMENT DEVICE WARM-UP

[76] Inventors: Jeff K. Lane, 11313 Main Rd.; Joseph M. Negri, 10435 Rustic Ridge, both of Fenton, Mich. 48430; Donald J. Harrod, 821 Milford Rd., Holly, Mich. 48442

[21] Appl. No.: 25,337

[22] Filed: Mar. 30, 1979

[51] Int. Cl.³ .......................... F01N 5/04; F02B 37/00
[52] U.S. Cl. ...................................... 60/602; 60/284; 60/280
[58] Field of Search ................. 60/600, 601, 602, 603, 60/280, 284, 288

[56] References Cited

U.S. PATENT DOCUMENTS 3,173,242  3/1965  Erickson .................. 60/601

FOREIGN PATENT DOCUMENTS 2326989  12/1974  Fed. Rep. of Germany ............ 60/280
2650033   5/1978  Fed. Rep. of Germany ............ 60/602

OTHER PUBLICATIONS

SAE Paper No. 780718, "Turbocharging Engines for Racing and Passenger Cars", Mezger, Aug. 7, 1978.

Primary Examiner—Michael Koczo

[57] ABSTRACT

In a preferred embodiment applied to an automotive vehicle engine with an exhaust turbocharger and an exhaust treatment device operative at elevated temperature and located after the turbine in the exhaust system, warm-up of the treatment device is speeded by a bypass system and valve that cuts off exhaust gas flow through the turbine and supplies the engine exhaust directly to the treatment device until its operating temperature is reached, after which the bypass is closed and normal flow through the turbine is provided. Additional features are also described.

12 Claims, 3 Drawing Figures

VEHICLE ENGINE WITH TURBINE BYPASS FOR EXHAUST TREATMENT DEVICE WARM-UP

TECHNICAL FIELD

This invention relates to engine driven automotive vehicles wherein the engine exhaust system includes an exhaust driven turbine and a heat initiated exhaust treatment device after the turbine in the exhaust system. In a more specific aspect, the invention relates to a turbocharged vehicle engine provided with a heat initiated exhaust treatment device located after the turbine and to means for accelerating warm-up of the treatment device to operating temperature.

BACKGROUND OF THE INVENTION

It is known in the art relating to internal combustion engines, including vehicle engines, to provide a turbine in the exhaust system to draw power from the engine exhaust gases. The turbine may be used for driving various devices and may be connected through a suitable power train with the engine output shaft to supplement the engine power output, thus forming a so-called turbocompound engine. Probably, however, the most common use of engine exhaust turbines is for driving a compressor in the engine induction system to compress the engine inlet charge in the manner well known in turbocharged engines.

The use of turbochargers as a means of increasing the maximum power of an engine has been known for many years. Nevertheless, until recently turbochargers have seen only limited application in automotive passenger vehicles and light duty trucks, in which adequate power has been obtainable merely by installing an engine of suitable displacement. Recently, however, the trend toward reducing the size of vehicle engines to increase the average fuel economy of the vehicle fleet has resulted in increased interest in and use of turbochargers as a means for providing additional power and performance from smaller sized engine packages.

At the same time, requirements for increasing control of vehicle exhaust emissions have resulted in recent years in the widespread usage of engine exhaust treatment devices for passenger and light duty commercial automotive vehicles, the so-called catalytic converter located in the engine exhaust system currently being the most commonly used treatment device.

The combination of these factors has resulted in the recent appearance of a turbocharged engine powered automobile having a catalytic converter exhaust treatment device located in the exhaust system after, or downstream of, the exhaust turbine. In this position the treatment device operates normally, when raised to its elevated operating temperature level by the heat of the exhaust gases, to promote the conversion of undesirable constituents in the exhaust gases, such as hydrocarbons and carbon monoxide, to uncontrolled compounds such as carbon dioxide and water. It is recognized, however, that, as emission control standards become more stringent, it may be necessary to provide additional means of arrangements by which the exhaust treatment device is more quickly brought to its operating temperature during warm-up so that the desired control of exhaust emissions is more quickly established.

SUMMARY OF THE INVENTION

The present invention provides a vehicle engine with a turbine bypass system provided with an appropriately placed bypass valve to pass the engine exhaust gases directly to the exhaust treatment device without passing through the turbine when the treatment device is below its operating temperature. The arrangement acts to increase the amount of exhaust heat supplied to the treatment device during warm-up so that its operating temperature is more quickly reached. Numerous advantageous features involving the construction and positioning of the bypass valve as well as the construction and operation of its associated actuating and control system are provided by the invention. These and other features and advantages will be more fully understood from the following description of certain embodiments taken together with the accompanying drawings.

BEST MODE FOR CARRYING OUT THE INVENTION

Figure 1:
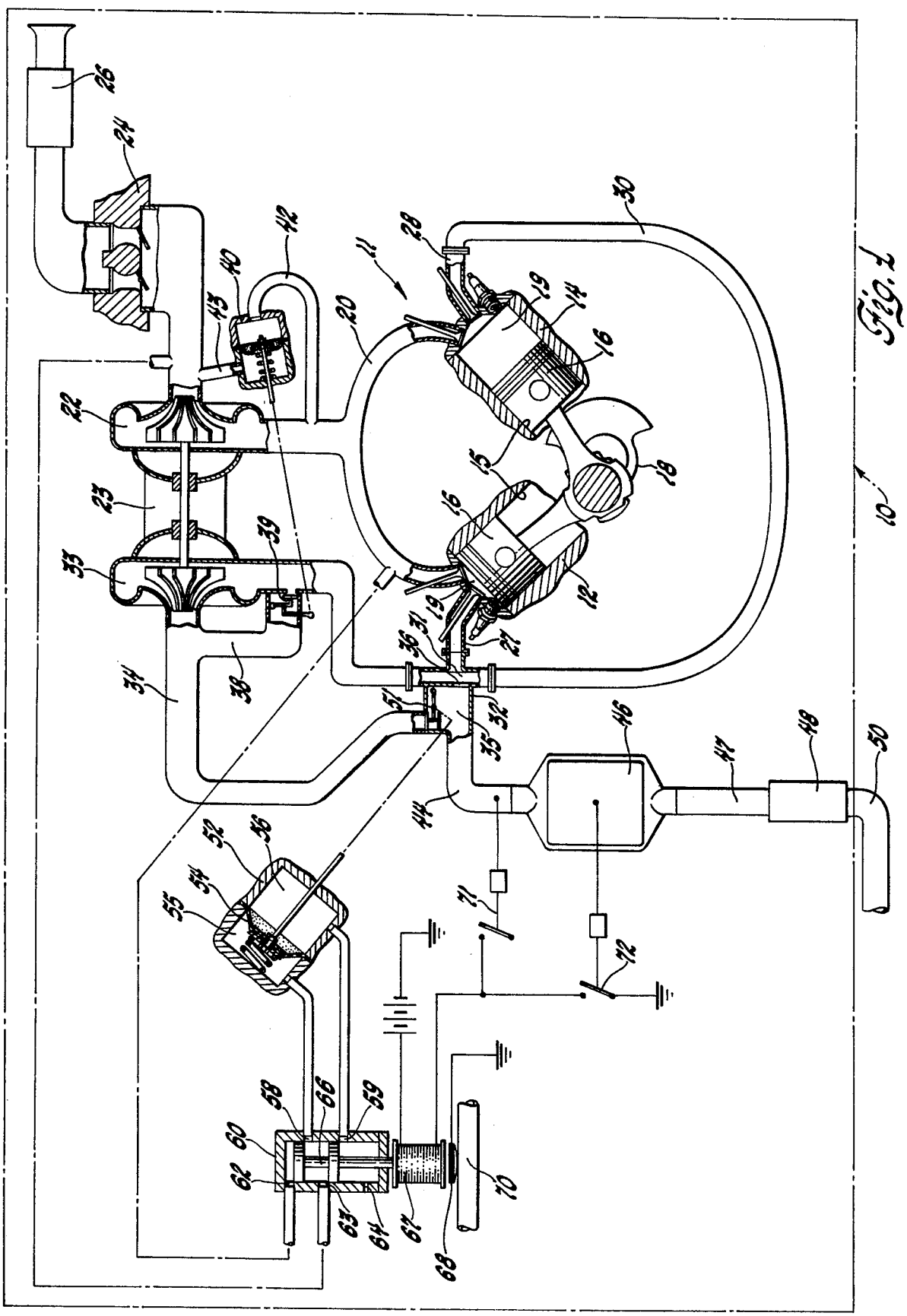
FIG. 1 is a semi-schematic diagram illustrating the arrangement of a turbocharged spark ignition engine in an automotive vehicle having a converter warm-up turbine bypass valve in accordance with the invention.

Referring first to FIG. 1 of the drawings, numeral 10 generally indicates an automotive vehicle, such as a passenger car, in which there is installed a spark ignited internal combustion engine 11. Engine 11 includes a pair of cylinder banks 12, 14 conventionally arranged in "V" fashion and each including a plurality of cylinders 15 containing reciprocable pistons 16 connected with an output crank 18 and defining with the cylinders variable volume combustion chambers 19.

The engine includes an intake system including an intake manifold 20 that connects the individual combustion chambers 19 with the outlet of a compressor 22 of a conventional engine turbocharger 23. The turbocharger is in turn connected with a carburetor 24 that is adapted to receive air from an air cleaner 26 and fuel from a suitable fuel supply system, not shown, and mix these fluids in conventional fashion to form a combustible air-fuel mixture which is supplied through the turbocharger compressor to the engine combustion chambers 19.

Engine 11 also is provided with an exhaust system including separate exhaust manifolds 27, 28, one for each bank of cylinders. A crossover pipe 30 interconnects the two manifolds conducting the exhaust gases from all the cylinders to an inlet chamber 31 in the housing 32 of a bypass valve assembly. From chamber 31 the gases are conventionally ducted to the inlet of the turbine 33 of the turbocharger 23 from which they may pass through an outlet duct 34 to an outlet chamber 35 of the bypass valve housing that is also connected through an opening 36 with the inlet chamber 31.

The turbocharger turbine is conventionally provided with an integral or close-coupled bypass passage 38 connecting the turbine inlet with the turbine outlet. A wastegate valve 39 is arranged to close or open the bypass passage in response to the action of a diaphragm actuator 40 that connects through conduits 42, 43 with the intake system on the outlet and inlet sides of the turbocharger compressor, respectively. The actuator 40 is spring biased to open the wastegate valve when the pressure differential across the compressor reaches a predetermined limit so as to control the maximum boost pressure developed by the turbocharger through bleeding off some of the exhaust gases around the turbine.

The outlet of the bypass valve housing 32 is connected by an outlet pipe 44 with an exhaust treatment device which in this case takes the form of a catalytic converter 46. The outlet of the converter is in turn connected with a conventional exhaust system including an exhaust pipe 47, muffler 48 and tailpipe 50 which carry the treated exhaust gases to atmosphere.

Within the bypass valve housing there is pivotally mounted a valve member 51 that is movable around its pivot to a first position shown in the drawing in which the valve member closes the end of the outlet duct 34, blocking gas flow through the turbine and opens the passage for flow of gases through the opening 36 directly through the outlet chamber 35 to the outlet pipe 44 and thus to the converter 46 via a short flow path that avoids passage through the turbine and its connecting conduits. The valve member 51 is also pivotable to a second position wherein the valve member closes the opening 36 and opens flow through the conduit 34 into the valve housing outlet chamber 35, thereby permitting normal exhaust gas flow through the turbine 33 to the converter 46 and closing the bypass passage (opening 36) around the turbine.

The bypass valve member 51 is connected with a diaphragm actuator 52 having a diaphragm 54 that is spring biased to urge the valve member 51 toward its second position, in which the bypass passage 36 is closed. The actuator defines first and second chambers 55, 56 located respectively on the spring side of the diaphragm and on the side opposite the spring. Chambers 55 and 56 are respectively connected with ports 58, 59 formed in the body of a control valve 60. Additional ports 62, 63, 64 are provided in the control valve body. Port 62 is connected with the intake manifold 20 to receive intake system pressures on the downstream side of the turbocharger compressor. Port 63 is connected with the intake system upstream of the compressor, but downstream of the carburetor, and port 64 is connected to atmosphere.

Interconnection of the valve ports is controlled by a reciprocable valve element 66 movable from a first position as shown in the drawing to a second position upon the energizing of a connected electric coil 67. In its first position with the coil deenergized, the actuator spring chamber 55 is supplied with compressor inlet vacuum, while the nonspring chamber 56 is vented to atmosphere. In the second position of the valve 60, the actuator spring chamber 55 is supplied with compressor outlet pressure (or vacuum) in the intake manifold, while the nonspring chamber 56 is supplied with compressor inlet vacuum.

The energizing of the coil 67 is preferably controlled in response to the temperature of an appropriate engine system such as the engine cooling system or the engine exhaust system, including the converter. In FIG. 1, the coil is provided with three independent temperature responsive switches by which it may be energized. At the end of the coil 67 is a snap switch 68 that is exposed to the temperature of engine cooling water in a conduit 70. When the water temperature rises above a predetermined value, the snap switch closes, energizing the coil 67. In like manner, the coil is also connected in parallel fashion with electric switches 71, 72 which are respectively responsive to sensed temperatures of the outlet pipe 44 and the catalytic converter 46. These switches are operative to close upon the reaching of predetermined temperatures in these portions of the engine exhaust system. Upon the closing of either of these switches, the coil 67 will be energized, moving the valve member 51 to its second position as in the case of closing of the snap switch 68.

Operation

The operation of the system so far described is as follows:

Upon starting of the engine in a cold condition, switches 68, 71 and 72 will be open and the coil 67 will be deenergized. Thus, control valve 60 will direct compressor intake vacuum to the spring chamber 55, causing a pressure differential that will overcome the force of the spring and move the valve member 51 to its first position, blocking the flow of exhaust gases through the turbine and permitting direct bypass of exhaust gases to the catalytic converter 46 as shown in the drawing. In this position, the maximum heat of the engine exhaust gases will be delivered to the converter, causing it to be warmed to operating temperature as quickly as possible. However, the turbocharger will be inoperative by reason of the fact that exhaust gases are bypassing its turbine.

This result has a double advantage from the standpoint of providing quick heating of the catalytic converter. First, the turbine wheel and housing, as well as all of its connecting piping leading to and from the turbine, are cut out of the gas flow path and thus do not absorb heat from the exhaust gases during the warm-up period. Instead, if the bypass valve is properly positioned on the vehicle, the exhaust gas flows by a much shorter path directly from the engine to the catalytic converter. Second, the normal function of the turbine when exhaust gas is passed through it is to absorb work from the gas, which results in its leaving the turbine at a lower pressure and temperature level. This heat removing effect is also avoided by directing the gases through the bypass instead of through the turbine.

While operating in the warm-up mode as above described, it should be apparent that the added engine power normally made possible by operation of the turbocharger to compress the inlet charge is not available since the turbocharger is not operating. The present system, however, is arranged to automatically overcome this shortcoming whenever the vehicle operator moves the accelerator to the wide open throttle position. In this condition, the compressor inlet vacuum is reduced to near ambient pressure so that the vacuum directed to the spring chamber 55 is no longer able to overcome the force of the spring bias acting against the diaphragm 54. In this situation, the spring moves the bypass valve member toward its second position, tending to close the bypass and direct exhaust gas flow through the turbocharger, so that increased engine power may be obtained when needed. When the throttle is again returned to less than its wide open condition, the increase in vacuum at the turbine inlet will again cause the vacuum actuator to move the bypass valve member 51 to its first position as shown in the drawing.

When after a relatively short interval, the temperatures of any of the selected sensed portions of the engine exhaust and cooling systems reach their predetermined values, one or all of the switches 68, 71, 72 will close, energizing the coil 67 and moving the valve element to its second position. This will supply compressor outlet pressure (or vacuum) to the spring chamber 55 and compressor inlet vacuum to the nonspring chamber 56. In this condition, the spring bias on the diaphragm will move the bypass valve member 51 to its second position, closing the bypass opening 36 and opening the conduit 34 from the turbine, thereby permitting the normal passage of exhaust gases through the turbine in advance of their passage through the catalytic converter 46. Further, the differential pressures acting on the diaphragm will supplement the action of the spring in that, as the engine power is increased and the exhaust pressure becomes greater, the differential pressures across the diaphragm also becomes greater. Thus, the force holding the valve member 51 is increased to overcome the pressure of the exhaust gases acting against the element through the orifice 36 and keep the valve element in its second position, closing the opening.

It should be apparent that many modifications could be made in the system so far described in both its structure and manner of operation so as to accomplish the desired purposes without departing from the inventive concepts disclosed. The construction and positioning of the bypass valve and its actuating and control elements may be varied to suit the differing needs of engine operation and vehicle installation. Additionally, any one of the indicated engine system temperatures might be used alone for actuating the control valve through energizing the coil 67, or some other appropriate engine temperature or related characteristic could be used to actuate this device. Additionally, it should be noted that it would be possible to utilize the bypass valve member 51 with suitable controls to operate also as a boost controlling wastegate valve, eliminating the need for the valve 39 and bypass 38. At present, however, it is considered more practical to retain the separate wastegate valve in the system since the amount of wastegate flow required for boost control is more easily controlled with a smaller valve than is required for the bypass function provided by the bypass valve member 51. Thus, operation of the valve 51 to provide controlling flow might prove to be somewhat difficult in a practical installation. Such a possibility is, however, recognized and included in the overall concepts of the present invention.

Vehicle Application

Figure 2:
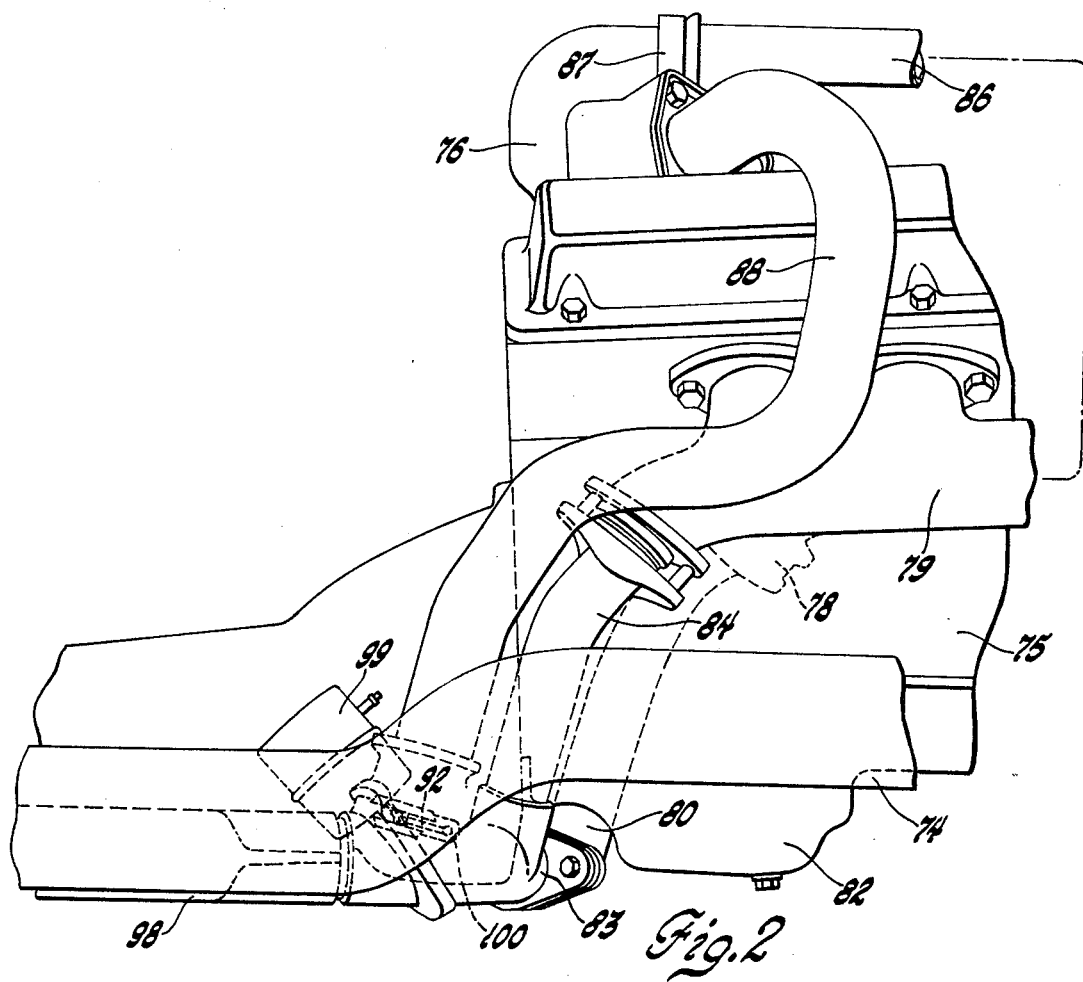
FIG. 2 is a partial side view of a vehicle mounted turbocharged engine having an appropriately placed converter warm-up turbine bypass valve in accordance with the invention.
Figure 3:
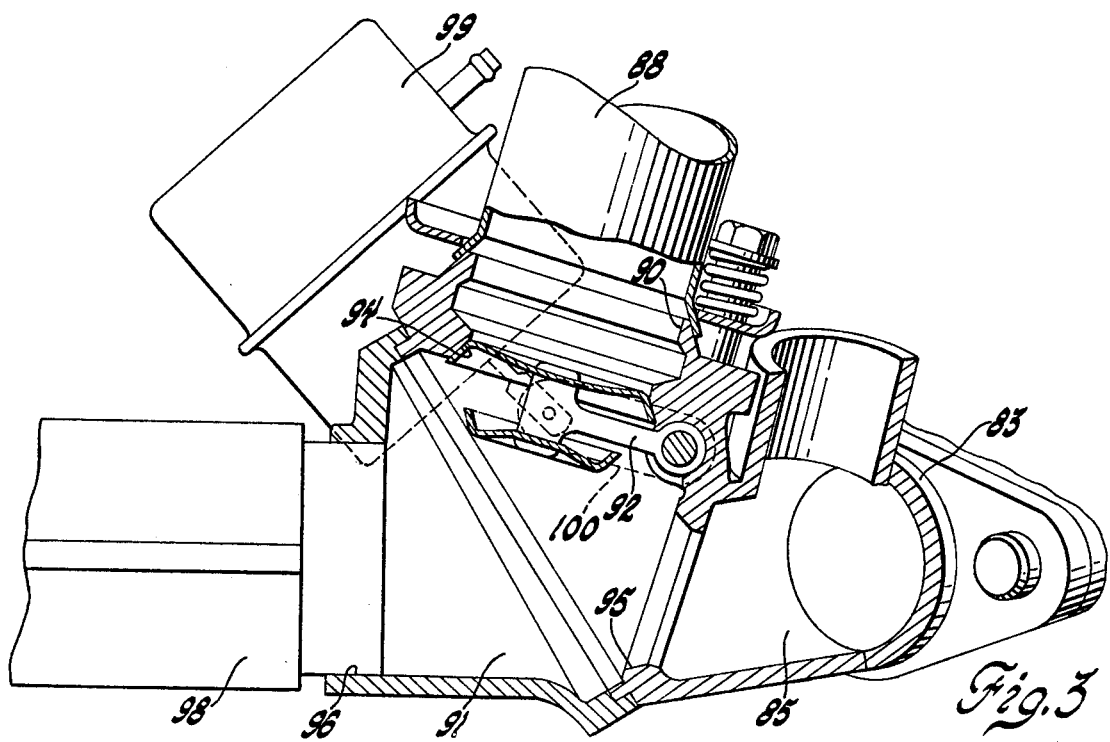
FIG. 3 is an enlarged fragmentary cross-sectional view showing certain internal construction details of the bypass valve of the engine of FIG. 2.

FIGS. 2 and 3 of the drawings illustrate the application of a bypass valve device according to the invention in a representative vehicle installation. In FIG. 2, numeral 74 represents the frame of a passenger car or other similar automotive vehicle. Frame 74 supports an engine transmission assembly 75, the engine having a turbocharger 76 mounted above the intake manifold, not shown, and between the cylinder heads of "V" arranged cylinder banks carrying on their outward sides exhaust manifolds 78 and 79. Exhaust gases from the left-hand manifold 78 are directed through a crossover pipe 80 under the engine oil pan 82 to a valve housing 83 located at about the right rear corner of the engine near the right-hand exhaust manifold 79. A short pipe 84 connects the valve housing with the rear end of the right-hand exhaust manifold 79, the two manifolds being interconnected through an internal inlet chamber or plenum 85, formed within the valve housing as shown in FIG. 3.

The front end of the exhaust manifold 79 is connected by an exhaust conduit 86 to the inlet flange 87 of the turbocharger turbine, while the turbine outlet connects through a pipe 88 with another inlet opening 90 in the bypass valve housing 83.

Housing 83 defines adjacent plenum 85 an outlet chamber or valve plenum 91 in which a pivotal valve element 92 is movably mounted. Valve element 92 is pivotally movable into engagement with first and second valve seats 94, 95, respectively, which are located in adjacent walls of the plenum. Valve seat 94 surrounds an opening which connects plenum 91 with the inlet opening 90 and its connected exhaust pipe 88. Valve seat 95 surrounds an opening connecting plenum 91 with plenum 85. The housing also defines an outlet opening 96 from the plenum 91 to which a catalytic converter 98 is connected. Housing 83 also supports a diaphragm actuator 99 that connects with a lever 100 operatively secured to the valve element 92 for moving it between first and second positions.

In operation when the engine is cold, valve element 92 is in the illustrated first position against valve seat 94, closing off the flow of exhaust gases to the turbocharger. In this condition, engine exhaust gases pass from manifold 78 and 79 through pipes 80 and 84, respectively, to the plenum 85 of the valve housing. From there, they pass directly into plenum 91 and to the catalytic converter which is mounted closely adjacent the valve housing so as to provide for the desired quick warm-up of the converter.

When the desired converter operating temperature has been reached, a suitable control system, such as that illustrated in FIG. 1, operates the diaphragm actuator 99 to move valve element 92 into its second position against valve seat 95, closing direct communication between plenums 85 and 91. In this condition, exhaust gas from manifold 78 passes through the cross-over pipe 80 and plenum 85 into the short pipe 84 and into the rear of the right-hand manifold 79. Here, it mixes with exhaust gases from the cylinders of the engine's right bank and travels therewith into pipe 86 to the turbocharger turbine inlet. After passing through the turbine, the gases are exhausted through pipe 88 into plenum 91 from which they pass directly into the catalytic converter, as previously described.

It should be noted that the positioning of the bypass valve in the arrangement of FIGS. 2 and 3 is such that the exhaust gases are required to travel a minimum distance from their respective manifolds to the catalytic converter when the valve is in its bypass open position. In this way, loss of heat from the exhaust gases is minimized and rapid warm-up of the converter is assured.

Such an arrangement yields a far superior result to that which would occur from trying to use, for example, the wastegate valve provided in the turbocharger as a bypass valve for converter warm-up. Such an application would require the exhaust gases to pass through the lengths of the relatively long exhaust conduit 86 and exhaust pipe 88, as well as through a portion of the turbocharger body or adjacent structure containing the wastegate bypass, all of which would have the effect of providing a considerable mass of metal which, in cold operation, would absorb heat from the exhaust gases before they could reach the catalytic converter. Thus, it should be apparent that the positioning of the exhaust bypass valve at a point capable of providing a minimum length of travel from the exhaust manifolds to the catalytic converter is an important feature of the turbine bypass concept provided by this invention.

While the invention has been disclosed by reference to certain specific embodiments chosen for purposes of illustration, it is recognized that numerous changes could be made in the disclosed arrangements without departing from the inventive concepts taught herein. Accordingly, it is intended that the invention not be limited to the specific details of the embodiments disclosed, but that it have the full scope permitted by the language of the following claims.

The embodiments of the invention in which an exclusive property or privilege is claimed are defined as follows:

1. The combination in an automotive vehicle of an internal combustion engine with at least one variable volume working and combustion chamber, intake and exhaust systems each connected with said combustion chamber for respectively conducting intake gases to and exhaust gases from the combustion chamber, said exhaust system including a power turbine for receiving power from the engine exhaust gases and an exhaust treatment device that utilizes waste heat to encourage reaction of undesirable products in the exhaust gases, said treatment device being downstream of the turbine, and the improvement comprising
   a bypass passage around the turbine and connecting the combustion chamber directly to the exhaust treatment device,
   a valve operable to open and close the bypass passage, and
   actuating and control means operative to operate said valve to open said bypass passage during warm-up to quickly heat the exhaust treatment device by the direct passage of exhaust gases thereto around the turbine and further operative to close said bypass upon warm-up of the treatment device to direct exhaust gases through the turbine for normal power recovery before being directed to the treatment device.

2. The combination in an automotive vehicle of a turbocharged internal combustion engine having a plurality of variable volume working and combustion chambers, intake and exhaust systems each connecting with said combustion chambers for respectively conducting intake gases to and exhaust gases from said combustion chambers, a turbocharger having a compressor in the intake system driven by a turbine in the exhaust system that recovers power from the engine exhaust gases and an exhaust treatment device that utilizes waste heat to encourage reaction of undesirable products in the exhaust gases, said treatment device being connected in the exhaust system downstream of the turbine, and the improvement comprising
   a bypass passage around the turbine and connecting the combustion chambers directly to the exhaust treatment device,
   a valve operable to open and close the bypass passage, and
   actuating and control means operative to operate said valve to open said bypass passage during warm-up to quickly heat the exhaust treatment device by the direct passage of exhaust gases thereto around the turbine and further operative to close said bypass upon warm-up of the treatment device to direct exhaust gases through the turbine for normal power recovery before being directed to the treatment device.

3. The combination of claim 2 wherein said actuating and control means are responsive to temperature in a preselected engine system.

4. The combination of claim 3 wherein said actuating and control means are responsive to engine coolant temperature.

5. The combination of claim 3 wherein said actuating and control means are responsive to temperature of a selected portion of the engine exhaust system.

6. The combination of claim 5 wherein said actuating and control means are responsive to temperature of the exhaust treatment device.

7. The combination in an automotive vehicle of a turbocharged internal combustion engine having a plurality of variable volume working and combustion chambers, intake and exhaust systems each connecting with said combustion chambers for respectively conducting intake gases to and exhaust gases from said combustion chambers, a turbocharger having a compressor in the intake system driven by a turbine in the exhaust system that recovers power from the engine exhasut gases and an exhaust treatment device that utilizes waste heat to encourage reaction of undesirable products in the exhaust gases, said treatment device being connected in the exhaust system downstream of the turbine, and the improvement comprising
   a bypass passage around the turbine and connecting the combustion chambers directly to the exhaust treatment device,
   a bypass valve in the exhaust system and movable into a first position wherein it opens the bypass passage and closes off exhaust flow through the turbine and a second position wherein said valve closes the bypass passage and opens free passage of exhaust gases through the turbine, and
   actuating and control means operative to move said valve into said first position during warm-up to quickly heat the exhaust treatment device by the direct passage of exhaust gases thereto around the turbine and further operative to move said valve to said second position upon warm-up of the treatment device to direct exhaust gases through the turbine for normal power recovery before being directed to the treatment device.

8. The combination of claim 7 wherein said exhaust treatment device is a catalytic converter.

9. The combination in an automotive vehicle of a turbocharged internal combustion engine having a plurality of variable volume working and combustion chambers, intake and exhaust systems each connecting with said combustion chambers for respectively conducting intake gases to and exhaust gases from said combustion chambers, a turbocharger having a compressor in the intake system driven by a turbine in the exhaust system that recovers power from the engine exhaust gases and an exhaust treatment device that utilizes waste heat to encourage reaction of undesirable products in the exhaust gases, said treatment device being connected in the exhaust system downstream of the turbine, and the improvement comprising
   a bypass passage around the turbine and connecting the combustion chambers directly to the exhaust treatment device,
   a bypass valve in the exhaust system and movable into a first position wherein it opens the bypass passage and closes off exhaust flow through the turbine and a second position wherein said valve closes the bypass passage and opens free passage of exhaust gases through the turbine, and actuating and control means including a pressure responsive actuator connected with said valve and operable to move said valve to a first position in which said bypass passage is opened and exhaust gas passage through said turbine is blocked and a second position wherein said bypass passage is closed and exhaust gas passage through said turbine is opened and a control valve responsive to temperature in a selected engine system to apply suitable actuating pressures to said actuator whereby to move said valve to said first position during warm-up to quickly heat the exhaust treatment device by direct passage of exhaust gases thereto around the turbine and further to move said valve to said second position after warm-up of the treatment device to direct exhaust gases through the turbine for normal power recovery before being directed to the treatment device.

10. The combination of claim 9 wherein said exhaust system further includes a second bypass passage around the turbine and disposed closer thereto than the first named bypass passage and a wastegate valve in said second bypass passage and controlled by actuating means responsive to intake system pressure to bypass exhaust gases around the turbine to control the maximum turbine boost pressure.

11. The combination of either claims 9 or 10 wherein said bypass valve in its second position is urged toward its first position by differential pressure in the exhaust system across said turbine, said pressure actuator defining first and second pressure chambers separated by movable wall means actuatably connected with said valve and spring means biasing said wall means in the same direction as positive pressure in said first pressure chamber to urge said valve toward its second position, the force of said spring being less than that required to maintain said valve in its second position against said differential pressure under high turbine inlet pressure operating conditions, said control valve being connected with said actuator pressure chambers and with said engine intake system on both sides of said compressor, said control valve being operative at normal engine operating temperatures to supply compressor outlet pressure to said first chamber and compressor inlet pressure to said second chamber whereby the differential boost pressure across the compressor is applied across said movable wall means to assist the spring in maintaining said bypass valve in its second position during high turbine inlet pressure operation.

12. The combination in an automotive vehicle of an internal combustion engine with at least one variable volume working and combustion chamber, intake and exhaust systems each connected with said combustion chamber for respectively conducting intake gases to and exhaust gases from the combustion chamber, said exhaust system including a power turbine for receiving power from the engine exhaust gases and an exhaust treatment device that utilizes waste heat to encourage reaction of undesirable products in the exhaust gases, said treatment device being downstream of the turbine, and the improvement comprising a bypass passage around the turbine and connecting the combustion chamber directly to the exhaust treatment device in a gas flow path significantly shorter than that through the power turbine, a bypass valve operable to open and close the bypass passage, and actuating and control means operative to operate said valve to open said bypass passage during warm-up to quickly heat the exhaust treatment device by the direct passage of exhaust gases thereto around the turbine and further operative to close said bypass upon warm-up of the treatment device to direct exhaust gases through the turbine for normal power recovery before being directed to the treatment device.

* * * * *

UNITED STATES PATENT AND TRADEMARK OFFICE
CERTIFICATE OF CORRECTION

PATENT NO. : 4,244,187

DATED : January 13, 1981

INVENTOR(S) : Jeff K. Lane, Joseph M. Negri, Donald J. Harrod

It is certified that error appears in the above-identified patent and that said Letters Patent are hereby corrected as shown below:

Title page, Col. 1, between lines 8 and 9 insert
--[73] Assignee: General Motors Corporation, Detroit, Mich.--

Col. 2, between lines 7 and 8 insert
--Attorney, Agent, or Firm-Robert J. Outland--.

Col. 1, line 60 change "of" to read --or--.

Signed and Sealed this

Fourth Day of August 1981

[SEAL]

Attest:

GERALD J. MOSSINGHOFF

Attesting Officer

Commissioner of Patents and Trademarks